United States Patent [19] [11] 3,735,910
Watson et al. [45] May 29, 1973

[54] FRICTION WELDING

[75] Inventors: Geoffrey Walter Watson; Brian Edward Jenkinson, both of Inverness, Scotland

[73] Assignee: A. I. Welders Limited, Inverness, Scotland

[22] Filed: Apr. 15, 1971

[21] Appl. No.: 134,290

[30] Foreign Application Priority Data
April 14, 1970 Great Britain................18543/70

[52] U.S. Cl..................................228/2, 29/470.3
[51] Int. Cl. ...............................B23k 27/00
[58] Field of Search .................29/470.3; 228/2; 156/23

[56] References Cited
UNITED STATES PATENTS 3,635,388  1/1972  Jenkinson et al..................228/2
3,563,444  2/1971  Loyd..................................228/2

Primary Examiner—J. Spencer Overholser
Assistant Examiner—Robert J. Craig
Attorney—Stevens, Davis, Miller & Mosher

[57] ABSTRACT

A friction welding machine for performing a welding operation including a heating phase and a forging phase, the machine being operative during the forging phase to convert kinetic energy produced by rotation of one of the workholding devices during the heating phase into axial thrust urging the workholding devices towards one another during the forging phase. The conversion of kinetic energy into an axial thrust may be made by two interengaged screw-threaded components, by a cam mechanism or by a mechanical lever system.

14 Claims, 5 Drawing Figures

FRICTION WELDING

This invention relates to friction welding. Friction welding is performed by rubbing together under pressure the surfaces of two workpieces which are to be welded together, thereby heating the material of the workpieces at the said surfaces to a plastic condition, and continuing to exert pressure urging the workpieces towards each other after relative movement producing the rubbing action has ceased, to produce a forging action and form the bond between them.

The axial force provided to press the surfaces together may be constant throughout the welding cycle, or may be varied so that either the pressure is constant during the heating part of the cycle and is changed to produce the final bond, or is maintained at one value during an initial preheating stage, is changed during an intermediate stage, and is changed again to produce the final bond.

It is an object of the present invention to provide improved means for producing an increased pressure to form the final bond.

In friction welding processes as hitherto proposed, the axial force has usually been provided by the direct application of liquid pressure or air pressure and has thus been limited by the characteristics of the liquid or air pressure system employed. If an increased axial force for producing the forging action is required, and a liquid pressure system is used, the size of the thrust-producing cylinder or cylinders, and of the pump or pumps must be sufficient to produce the required thrust for forging and, if a pneumatic system is used, taking compressed air from a normal supply system at 80 p.s.i. the thrust producing cylinders would be very large as compared with other components of the welding machine.

According to the present invention there is provided a friction welding machine for performing a friction welding operation including a heating phase and a forging phase, said machine comprising a first workholding device, a second workholding device, means for advancing one of said workholding devices towards the other during the heating phase of a welding operation to bring workpieces held in said workholding devices into contact one with the other, means for rotating one of said workholding devices during the said heating phase, means operative during the forging phase to lock said advancing means, and means operative during the forging phase of a welding operation to convert kinetic energy produced by rotation of said one workholding device during the said heating phase into axial thrust urging one of said workholding devices towards the other to provide a greater axial force between the workpieces than is provided by the means for advancing said one workholding device during the heating phase.

Kinetic energy produced by rotation of said one workholding device may be stored in means for storing kinetic energy including a rotatable assembly, and the means to convert the stored kinetic energy into axial thrust may comprise two interengaged screw-threaded components or a cam mechanism.

The means for advancing one workholding device towards the other during the heating phase may comprise a mechanical lever system or at least one liquid pressure ram-and-cylinder device.

Some embodiments of the invention will now be described, by way of example, with reference to the accompanying drawings, in which.

Friction welding machines are known in which the workpieces are mounted for the performance of a welding operation with their axes vertical, and other friction welding machines are known in which their workpieces are mounted for the performance of a welding operation with their axes horizontal. In either case, one workpiece is rotated, while the other is held stationary, to create friction and resultant heating of the contacting ends of the workpieces. In some machines the rotating workpiece, or in other machines the non-rotating workpiece, is mounted in an axially movable support to enable it to be moved towards and pressed against the other workpiece.

The described embodiments of the invention include several of the above-mentioned arrangements, and it is to be understood that the invention may also be applied to other arrangements of welding machines not specifically described.

Figure 1:
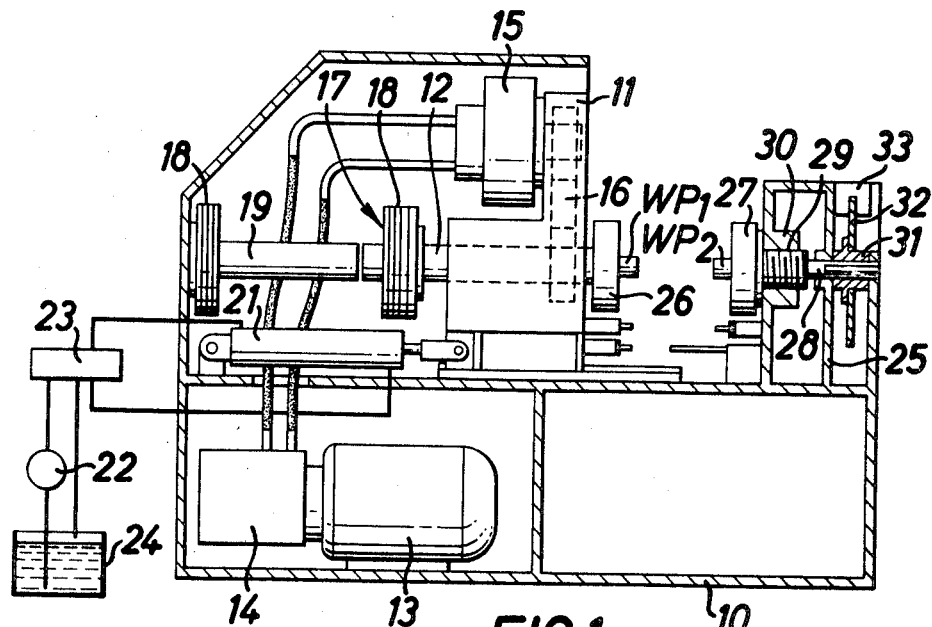
FIG. 1 is a sectional side elevation of one form of friction welding machine embodying the invention.

Referring to FIG. 1 of the drawings the friction welding machine therein shown is of the kind in which the workpieces are mounted for a welding operation with their axes horizontal. In this embodiment, one workpiece, during the heating phase of the welding operation, is both rotated and advanced towards the other workpiece which is held against both axial movement and rotation.

The machine comprises a rigid frame 10 on which is mounted a rectilinearly slidable headstock 11 in which is rotatably mounted a shaft 12. The shaft 12 moves rectilinearly with the headstock and is arranged to be driven by an electric motor 13 through a liquid pressure transmission system comprising a pump 14 and motor 15, provision being made in known manner for disconnecting the drive so that the shaft 12 can rotate freely. The liquid pressure motor 15 is connected to the shaft 12 by a belt drive 16. A flywheel 17 mounted on the shaft 12, and capable of being varied in mass by the addition or removal of discs 18 which are stored when not in use on a fixed shaft 19, stores kinetic energy during rotation of the shaft 12. The headstock 11 is movable in its rectilinear path by liquid pressure acting in one or more ram-and-cylinder devices 21 to which liquid under pressure is supplied from a suitable source, such as a pump shown diagrammatically at 22, through a selector valve, shown diagrammatically at 23. Selector valve 23 is capable of connecting the ends of the cylinder or cylinders of the ram-and-cylinder device or devices 21 selectively to the pump 22 or to a liquid reservoir 24.

The selector valve 23 may be of a known type capable of trapping liquid in the cylinder or cylinders of the ram-and-cylinder devices 21 to lock the headstock against rectilinear movement. A relief valve is provided to release liquid from said device or devices 21 if an excessive thrust is applied thereto by the headstock 11, or mechanical locking means (not shown) may be provided which are engageable to hold the headstock against rectilinear movement.

A tailstock 25 is fixedly mounted on the rigid frame 10.

A first workholding device 26 is fixedly mounted on the shaft 12 to support a workpiece WP₁ for axial movement with the headstock 11 and for rotation with the shaft 12. A second workholding device 27, adapted to support a second workpiece WP₂ is fixed to a shaft 28 screw-threaded at 29 to engage a screw-thread in a boss 30 on the tailstock 25. The shaft 28 is splined to receive a splined hub 31 carrying a brake disc 32 co-operating with a brake caliper assembly 33 to hold the shaft 28 against rotation in the tailstock 25.

In carrying out a friction welding operation in the machine shown in FIG. 1, workpieces WP₁ and WP₂ are mounted respectively in the workholding devices 26 and 27. The brake 32, 33 is applied to hold the workholding device 27 against rotation, and the workholding device 26 is rotated by the electric motor 13, while being advanced towards the workholding device 27 by liquid pressure acting in the ram-and-cylinder device or devices 21. The advance of the workholding device 26 brings the workpieces WP₁ and WP₂ into contact, and, due to the rotation of the workpieces WP₁, the said workpieces are rubbed together, the friction between them generating heat and rendering the metal of said workpieces adjacent the interface plastic. During such rubbing contact, a predetermined end load is applied to the workpieces by the ram-and-cylinder device or devices 21, this being the maximum load which is required to be exerted by said devices 21.

At a predetermined point in the welding cycle, which may be determined by a timer brought into operation when the workpieces come into contact, or by the approach of the headstock to within a predetermined distance of the tailstock, the brake 32, 33 is released, allowing the workpiece WP₂ with the workholding device 27 and shaft 28 to rotate due to the frictional drag between the workpieces. At the same time as the brake 32, 33 is released, the drive to the shaft 12 is disconnected and the headstock 11 is locked against rectilinear movement. The shaft 12 continues to rotate due to the kinetic energy stored in the flywheel 17 and other rotating parts, but the said parts gradually slow down and eventually stop as the kinetic energy is dissipated.

The rotation imparted to the workpiece WP₂ after the brake 32, 33 is released is transmitted to the shaft 28, turning the screw-threaded portion thereof in the screw-threaded boss 30 to urge the workpiece WP₂ towards the workpiece WP₁ with a very high force to effect forging together of the workpieces.

Thus the high axial thrust during the forging phase of the welding operation is produced mechanically using kinetic energy stored during the heating phase, and the liquid pressure ram-and-cylinder device or devices are not required to produce any greater thrust than is required during the heating phase.

Figure 2:
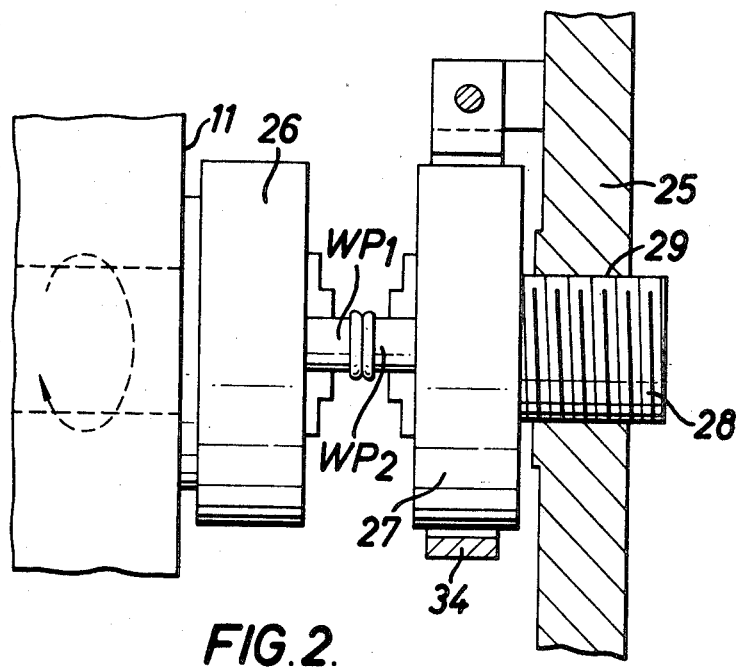
FIG. 2 is a detail view showing a modification of the arrangement shown in FIG. 1.

In the modified arrangement shown in FIG. 2, which is applicable to the machine shown in FIG. 1, a part of the machine headstock is shown at 11 and a part of the tailstock at 25. The workholding devices are shown at 26 and 27 holding the respective workpieces WP₁ and WP₂. The shaft 28 carrying the workholding device 27 has screw-threaded engagement with the tailstock at 29. The disc brake 32, 33 is omitted and a band brake 34, acting on a cylindrical peripheral surface of the work-holding device 27, is provided to hold that workpiece against rotation.

The operation of this modified arrangement will be obvious from the preceding description given with reference to FIG. 1.

Figures 3, 4:
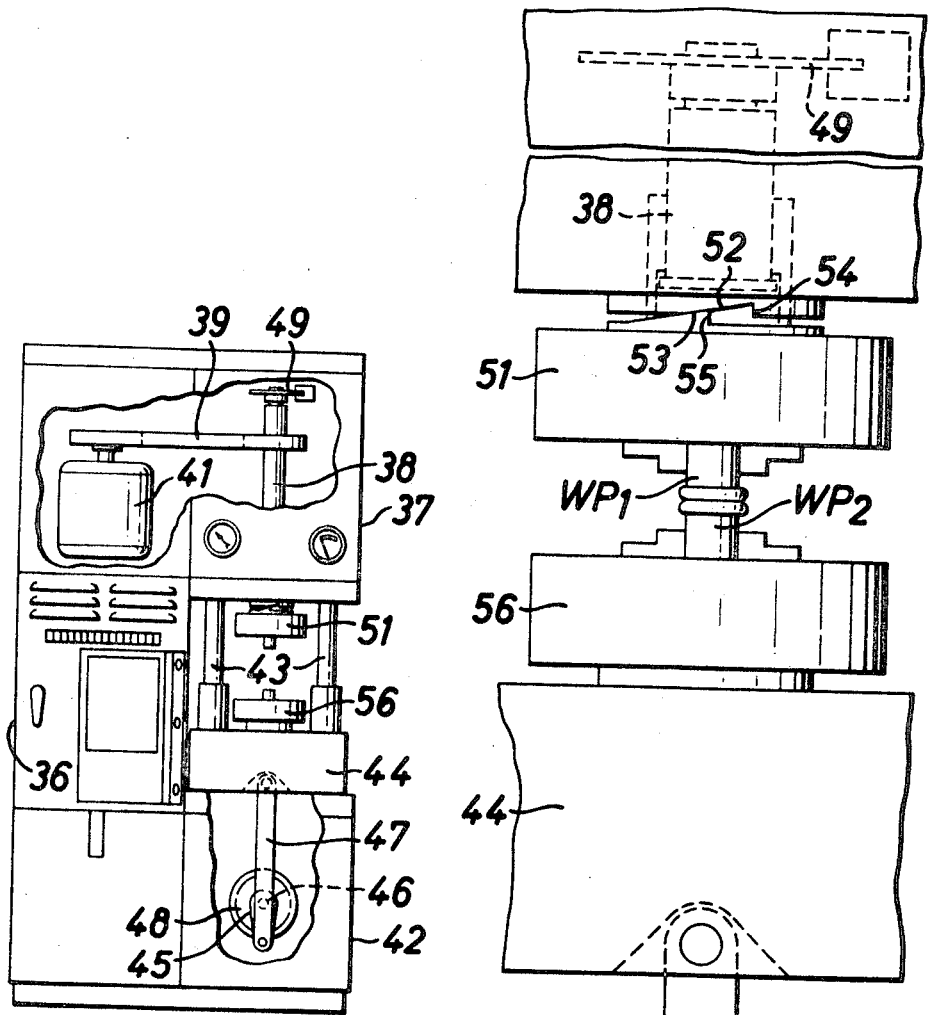
FIG. 3 is a partly sectional side elevation of another form of friction welding machine embodying the invention.
FIG. 4 is a detail view on a larger scale than FIG. 3, of some of the components shown in FIG. 3.

Referring now to FIGS. 3 and 4 of the drawings, the friction welding machine shown in FIG. 3 is of the kind in which the workpieces are mounted for a welding operation with their axes vertical. In this embodiment one workpiece, during the heating phase of the welding operation, is rotated but held against axial movement, and the other workpiece, which is held against rotation during that phase, is advanced towards the rotatable workpiece.

Referring to FIG. 3, the welding machine comprises a rigid upstanding frame 36 to one side of which is secured, at the upper end of said frame, a fixed headstock 37 in which is mounted for rotation a shaft 38. The shaft is held against axial movement and driven, through a belt drive 39, by an electric motor 41 mounted in the frame 36. A housing 42 extends laterally from the frame 36 so as to be below the headstock 37. Guide bars 43 fixed at one end to the headstock 37 and at the other end to the housing 42 provide supports on which a tailstock 44 is slidable towards and away from the headstock, the said tailstock being held by the guide bars 43 against rotation.

Movement of the tailstock 44 towards and away from the headstock 37 is effected by a crank lever 45 mounted on a shaft 46. Shaft 46 is rotatably mounted in the housing 42 and coupled by a connecting rod 47 to the tailstock 44. Angular movement of the crank lever is effected by a rotary liquid pressure actuator 48, by a reversible electric motor or by manual means such as an external lever acting directly or through transmission means providing a mechanical advantage on the shaft 46.

A disc brake 49 is provided to hold the headstock shaft 38 against rotation and, as more clearly shown in FIG. 4, a workholding device 51 is rotatably mounted on said shaft 38. Mating face cams 52, 53 are provided on the shaft 38 and workholding device 51 together with radial abutment surfaces 54 and 55 which engage one with the other when the shaft 38 is driven by the electric motor 41 in the direction in which it rotates during a welding operation, thereby transmitting rotation positively from shaft 38 to the workholding device 51. When the abutment surfaces 54 and 55 are in engagement one with the other, the relation of the face cams 52 and 53 is such that the workholding device 51 is in its axial position nearest to the headstock 38. However, rotation of the device 51 relative to the shaft 38 in the above-mentioned direction causes the workholding device to move axially away from the headstock 38 due to the interaction of the cams.

A second workholding device 56 is fixed to the tailstock 44 so as to be held against rotation and to move axially with the tailstock.

To carry out a friction welding operation in this machine, workpieces WP₁ and WP₂ are mounted in the workholding devices 51 and 56 and, with the brake released, rotation is imparted to the shaft 38 by the electric motor 41. The shaft 46 is rotated to move the tailstock 44 towards the headstock 37, for example from the position shown in FIG. 3 in which the crank lever 45 extends from the shaft 46 away from the tailstock to the position shown in FIG. 4, where it extends towards the tailstock and is in line with the connecting rod 47 (when contact between the workpieces is made crank lever 45 has not yet reached the position show in FIG. 4). Continued angular movement of the crank lever 45 forces the workpieces together to create friction between them with the resultant heat causing the metal at the workpiece interface to become plastic and to be extruded until the crank lever 45 and connecting rod 47 reach the position shown in FIG. 3. The workholding device 56 is rigidly supported by the lever and connecting rod against retraction.

At the end of the heating phase of a welding operation the driving of the shaft 38 by the electric motor 41 is discontinued, and the brake 49 is applied to stop the shaft 38. The workholding device 51 tends to continue its rotation due to kinetic energy stored therein and the face cam 53 therefore rides up the face cam 52, providing a very high axial force between the workpieces to effect forging.

When a welded component has been removed and a fresh welding operation is started, the workholding device 51 returns automatically to its initial angular position relative to the headstock 37, in which the abutment faces 54 and 55 are in contact due to the reaction to engagement of the workpieces.

The combination of face cams described with reference to FIG. 4 may be replaced by screw-threads or by other arrangements of cam mechanisms.

It will be appreciated that the arrangement specifically described with reference to FIGS. 3 and 4 provides a wholly mechanical force system for applying axial thrust to the workpieces during the welding operation.

Figure 5:
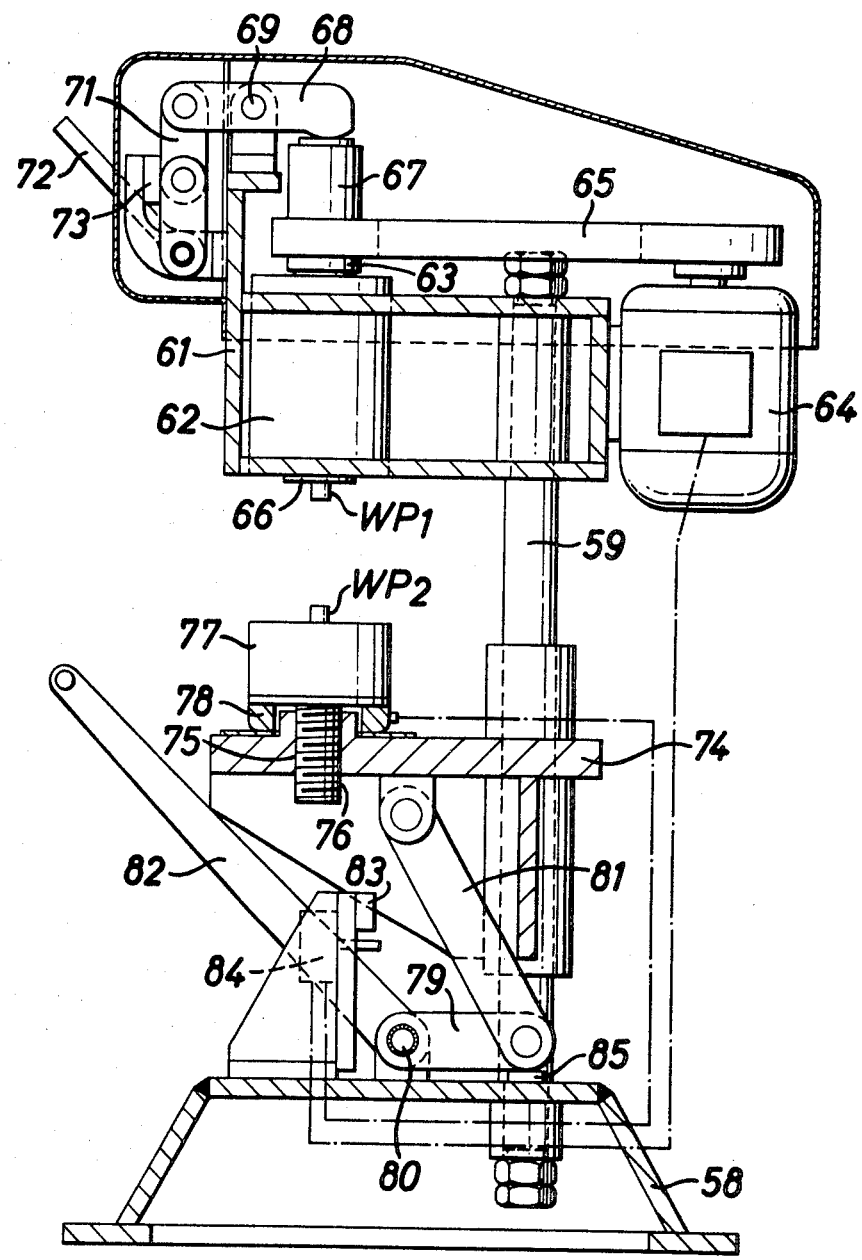
FIG. 5 is a sectional side elevation of another form of friction welding machine embodying the invention.

Referring now to FIG. 5 of the drawings, the friction welding machine shown therein requires only a standard three-phase electrical supply for its operation. The machine comprises a rigid base 58 from which extends vertically upwardly two guide bars, one of which is shown at 59, with a headstock 61 being rigidly secured to the upper ends of the said guide bars. A housing 62 mounted in the headstock 61 supports a spindle 63 rotatable about a vertical axis by an electric motor 64. Electric motor 64 drives the spindle 63 through a drive belt 65. The spindle 63, at its lower end, carries a workpiece holder 66 which holds a first workpiece $WP_1$. Spring means (not shown) enclosed in a housing 67 carried by the spindle 63 actuates workpiece clamping means in the holder 66. The spring means is acted on to release the clamping means by a lever 68, pivoted at 69 on the headstock 61. Lever 68, which applies pressure to the spring means to release the workpiece clamping means, is moved by a toggle linkage 71 operated by a hand lever 72. The toggle linkage 71 is shown in FIG. 5 in the clamping means releasing position, the toggle links having been moved, from a collapsed position in which their elbow pivot is to the right of a line joining their end pivots, slightly past a straight position, into a position in which the links, at the elbow, contact an abutment 73, so that the toggle is locked and the workpiece clamping means is held in the released position.

A tailstock 74 is slidably mounted on the guide bars 59 and has a screw-threaded hole 75, aligned with the headstock spindle 63. Mounted in the hole 75 is a screw-threaded shaft 76 which carries a second workholding device 77 that holds a second workpiece $WP_2$. An electromagnetic brake 78 is provided to hold the workholding device 77 against rotation.

A crank lever 79, mounted on a pivot shaft 80 carried in bearings on the base 58, is coupled by a connecting rod 81 to the tailstock 74 and is angularly movable to lift and lower the tailstock by a hand lever 82 fixed to the pivot shaft 80. The crank lever 79 and connecting rod 81 constitute an over-center linkage movable, from the position shown in FIG. 5, to a position in which the crank lever 79 engages a fixed stop 83, wherein the lever 79 and connecting rod 81, just before the crank lever contacts the stop, pass through a dead-center position so that, when the crank lever engages the stop, the tailstock is locked against downward movement.

An electrical switch 84, arranged to be actuated by the crank lever 79 just before it contacts the stop 83, controls the electrical circuits of the motor 64 and electromagnetic brake 78 so that those circuits are closed until the crank lever is almost in contact with the stop, and remain open so long as the crank lever is in contact with the stop.

The operation of the machine described with reference to FIG. 5 is as follows. With the tailstock 74 retracted downwardly to a position determined by contact of the crank lever 79 with an abutment pad 85 on the base 58, the workholding device 66 is opened by upward movement of the lever 72 to allow the workpiece $WP_1$ to be inserted, and then closed to clamp that workpiece in position. A workpiece $WP_2$ is inserted and clamped in the workholding device 77. The electric motor is then started by means of a suitable manual control the operation of which also causes electric current to be supplied to the electromagnetic brake 78, so that the workpiece $WP_1$ is rotated and the workpiece $WP_2$ is held stationary.

The hand lever 82 is now moved downwardly to lift the tailstock 74, and with it the workpiece $WP_2$ until contact is made with the workpiece $WP_1$, the crank lever 79 by this time being near to a straight-line relation with the connecting rod 81, so that a high mechanical advantage is obtained and a sufficient axial load is exerted between the workpieces to provide frictional heating and extrusion of plastic metal therefrom. During the application of this axial load the crank lever 79 and connecting rod 81 continue to approach the straight-line relation and pass over-center to contact the stop 83.

At or about the time when the straight-line relation is reached, the switch 84 is operated to stop the supply of electric current to the motor 64 and release the electromagnetic brake 78. Rotation of the workpiece $WP_1$ continues due to the kinetic energy stored in the shaft 63 and the parts rotating therewith and, due to the frictional drag between the workpieces such rotation is transmitted to the workpiece $WP_2$ and workholding device 77. The rotation of the latter is due to its screw-threaded connection to the tailstock 74. Thus, a high axial thrust between the workpieces is produced to effect forging.

After a welding operation has been completed, the workholding device 77 can be rotated manually or by any other suitable means to return it to its initial position.

It is to be understood that the illustrations of friction welding machines provided by the drawings are to a large extent diagrammatic, and that normal engineering refinements would be introduced into actual machines. For example, to improve the concentricity of the workpieces the components between which the screw threads or cams are provided to produce relative axial movement would usually be provided, on both sides of the screw threads or cams, with linear ball bearings or other precision bearings. Moreover various modifications or refinements of each friction welding machine described may be incorporated. For example, any suitable form of drive means may be used in place of the belt drive described, and any other form of electrically operated brake mechanism may be used in place of the electromagnetic brake described.

It is to be understood also that use of each described embodiment of the invention is not restricted to its use in the particular form of friction welding machine in which it is embodied in the foregoing description. For example, the form of friction welding machines illustrated in FIGS. 3, 4 or 5 may incorporate workholding devices similar to the workholding devices 26 and 27 of FIGS. 1 and 2.

We claim:

1. A friction welding machine for performing a friction welding operation including a heating phase and a forging phase, said machine comprising a first workholding device, a second workholding device, means for advancing one of said workholding devices towards the other during the heating phase of a welding operation to bring workpieces held in said workholding devices into contact one with the other, means for rotating one of said workholding devices during the heating phase, means, operative during the forging phase, for locking said advancing means, and means, operative during the forging phase of a welding operation, for converting kinetic energy produced by said workholding device which is rotated during the heating phase into axial thrust urging one of said workholding devices towards the other to provide a greater axial force between the workpieces than is provided by the means for advancing said one workholding device during the heating phase.

2. A friction welding machine according to claim 1, wherein kinetic energy produced by rotation of said one workholding device is stored in means for storing kinetic energy including a rotatable assembly, and the means for converting the stored kinetic energy into axial thrust comprises two interengaged screw-threaded components.

3. A friction welding machine according to claim 1, wherein kinetic energy produced by rotation of said one workholding device is stored in means for storing kinetic energy including a rotatable assembly, and the means for converting the stored kinetic energy into axial thrust comprises a cam mechanism.

4. A friction welding machine according to claim 1, wherein the means for advancing one workholding device towards the other during the heating phase comprises a mechanical lever system.

5. A friction welding machine according to claim 1, wherein the means for advancing one workholding device towards the other during the heating phase comprises at least one liquid pressure ram-and-cylinder device.

6. A friction welding machine according to claim 1 comprising a frame, a headstock movable rectilinearly in said frame, a tailstock fixedly mounted in said frame, means for applying thrust to said headstock to urge it towards said tailstock, a rotatable shaft mounted in said headstock, means for driving said rotatable shaft, means for releasing said rotatable shaft for free rotation by stored kinetic energy, a first workholding device carried by said rotatable shaft, a second shaft mounted in said tailstock co-axial with said headstock shaft, a second workholding device mounted on said second shaft, interengaging screw threads on said second shaft and said tailstock, brake means operative for holding said tailstock against rotation, means for locking said headstock against rectilinear movement away from said tailstock, and control means operative for effecting sequentially during a welding operation, advance of said headstock towards said tailstock with said rotatable shaft rotating and said second shaft held against rotation, and release of said rotatable shaft and of said brake means with locking of said headstock against retracting movement, so that said second workholding device is urged axially towards said first workholding device by the action of the screw threads while said shafts are rotated by kinetic energy stored therein.

7. A friction welding machine according to claim 6, wherein the brake means comprises a disc brake.

8. A friction welding machine according to claim 6, wherein the brake means comprises a band brake.

9. A friction welding machine according to claim 1, comprising a frame, a headstock fixedly mounted in said frame, a shaft rotatably mounted in said headstock, means for driving said rotatable shaft, a first workholding device mounted on said rotatable shaft, means for transmitting rotation of said shaft positively to said workholding device in one direction, cam means acting between said shaft and said workholding device whereby rotation of said workholding device in advance of said shaft in said direction of rotation imparts axial movement to said workholding device, a brake operative to hold said shaft against rotation, a tailstock, means mounting said tailstock for rectilinear movement towards and away from said headstock, a second workholding device fixedly mounted on said tailstock, means for moving said tailstock towards said headstock and exerting axial thrust between workpieces mounted in said workholding devices, means for locking said tailstock against backward movement at the end of an approach movement thereof towards the headstock and means for disconnecting the drive to said rotatable shaft and applying the brake thereto at the end of said approach movement, so that continued rotation of said first workholding device by kinetic energy stored therein causes said first workholding device to be urged towards said second workholding device due to the action of said cam means.

10. A friction welding machine according to claim 9, wherein the means for moving the tailstock towards the headstock comprises a crank lever, a connecting rod connecting said crank lever to said tailstock, and means for rotating a shaft carrying said crank lever, and stop means for engagement by said crank lever in an over-dead-center position when the tailstock is fully advanced towards the headstock.

11. A friction welding machine according to claim 1, comprising a frame, a headstock fixed against axial movement in said frame, a shaft rotatably mounted in said headstock, drive means for imparting rotation to said shaft, a tailstock movable towards and away from said headstock, a first workholding device carried by said shaft, a second workholding device carried by said tailstock and having screw-threaded engagement therewith, a brake which holds said second workholding device against rotation, manually operable lever means for urging said tailstock towards said headstock, means for locking said tailstock against retractive movement at the end of an advance movement towards said headstock and means, operative at the end of said advance movement, for discontinuing the drive to the first workholding device and releasing the brake on the second workholding device, thereby enabling rotation of the workholding devices to be continued by stored kinetic energy, the rotation of the second workholding device, due to its screw-threaded engagement with the tailstock, imparting axial thrust thereto urging it towards the first workholding device.

12. A friction welding machine according to claim 11, wherein the manually operable lever means comprises a crank lever fixed to a shaft mounted in fixed bearings, a connecting rod connecting said crank lever to said tailstock, and a manual lever fixed to said shaft.

13. A friction welding machine according to claim 12, wherein the crank lever and connecting rod are arranged to pass through a dead-center position at the end of the approach movement of the tailstock towards the headstock and to engage a fixed abutment to lock the tailstock against retractive movement.

14. A friction welding machine according to claim 13, wherein the drive means is an electric motor, the brake is an electromagnetic brake, and comprising switch means, operated by the crank lever, for operating an electric circuit to cut off the electric current supply to the said motor, and to release the electromagnetic brake, when the crank lever approaches the fixed abutment.

* * * * *